US012578424B2

(12) United States Patent　　(10) Patent No.:　　US 12,578,424 B2

Park et al.　　(45) Date of Patent:　　Mar. 17, 2026

(54) APPARATUS FOR DRIVER ASSISTANCE

(71) Applicant: HL KLEMOVE CORP., Incheon (KR)

(72) Inventors: Jonggyu Park, Gyeonggi-do (KR);
Sangmin Kim, Gyeonggi-do (KR);
Hanyeol Yu, Gyeonggi-do (KR);
Hyeondong Cho, Gyeonggi-do (KR)

(73) Assignee: HL KLEMOVE CORP., Incheon (KR)

( * ) Notice: Subject to any disclaimer, the term of this
patent is extended or adjusted under 35
U.S.C. 154(b) by 271 days.

(21) Appl. No.: 18/221,870

(22) Filed: Jul. 13, 2023

(65) Prior Publication Data

US 2024/0061073 A1　　Feb. 22, 2024

(30) Foreign Application Priority Data

Aug. 16, 2022　　(KR) ........................ 10-2022-0102003

(51) Int. Cl.
G01S 7/03　　　(2006.01)
G01S 13/931　　(2020.01)
(52) U.S. Cl.
CPC ............ G01S 7/032 (2013.01); G01S 13/931
(2013.01); *G01S 2013/9318* (2020.01);
(Continued)
(58) Field of Classification Search
CPC ................... G01S 7/032; G01S 13/931; G01S
2013/93185; G01S 2013/9318;
(Continued)

(56) References Cited

U.S. PATENT DOCUMENTS 9,860,978 B1　　1/2018　Liu et al.
10,408,931 B2 *　9/2019　Fetterman .............. H01Q 21/29
(Continued)

FOREIGN PATENT DOCUMENTS

JP　　　2013-160607　　　8/2013
JP　　　2021-039105　　　3/2021
KR　　10-2021-0011881　　2/2021

OTHER PUBLICATIONS

Office Action dated Jan. 3, 2025 for Korean Patent Application No.
10-2022-0102003 and its English translation provided by Appli-
cant's foreign counsel.

(Continued)

*Primary Examiner* — David R Dunn
*Assistant Examiner* — Yonghong Li
(74) *Attorney, Agent, or Firm* — WOMBLE BOND
DICKINSON (US) LLP

(57)　　　　　　ABSTRACT

Disclosed herein is an apparatus for driver assistance. The
disclosed apparatus includes a radar module configured to
provide information on an object around a vehicle, and a
controller configured to control at least one of a driving
device, a braking device, or a steering device of the vehicle
based on the information on the object. The radar module
includes an antenna module installed on the vehicle to have
a sensing area in an outward direction of the vehicle and
acquire radar data, and a processor configured to acquire the
information on the object around the vehicle based on
processing the radar data. The antenna module includes a
first board facing a first direction, a first antenna array
provided on the first board to radiate radio waves in the first (Continued)

direction and provide the radar data to the processor, a second board facing a second direction different from the first direction, a second antenna array provided on the second board to radiate radio waves in the second direction and provide the radar data to the processor, and a bridge configured to electrically and physically connect the first board and the second board.

13 Claims, 9 Drawing Sheets

(52) U.S. Cl.
CPC ............... *G01S 2013/93185* (2020.01); *G01S 2013/9319* (2020.01); *G01S 2013/93272* (2020.01); *G01S 2013/93274* (2020.01)

(58) Field of Classification Search
CPC . G01S 2013/93274; G01S 2013/93272; G01S 2013/9319; G01S 13/003; G01S 13/87; G01S 7/02; G01S 7/027; G01S 2013/93271; B60W 10/06; B60W 10/10; B60W 10/18; B60W 10/20; B60W 40/02; B60W 2050/0005; B60W 2420/408; H01Q 1/325; H01Q 1/38

See application file for complete search history.

(56) References Cited

U.S. PATENT DOCUMENTS

| | | | | |
|---|---|---|---|---|
| 11,435,465 | B2 * | 9/2022 | Yu | H01Q 21/28 |
| 2006/0145778 | A1 * | 7/2006 | Pleva | H01P 5/107 |
| | | | | 333/26 |
| 2010/0051326 | A1 * | 3/2010 | Sagisaka | H05K 3/4691 |
| | | | | 174/254 |
| 2017/0088205 | A1 | 3/2017 | Karras et al. | |
| 2020/0238986 | A1 * | 7/2020 | Oh | B60W 10/20 |
| 2021/0063557 | A1 | 3/2021 | Yu et al. | |
| 2021/0305720 | A1 * | 9/2021 | Zhang | H01Q 1/38 |
| 2023/0408637 | A1 * | 12/2023 | Murakami | G01S 13/87 |

OTHER PUBLICATIONS

Office Action dated Sep. 16, 2025 for Korean Patent Application No. 10-2022-0102003 and its English translation provided by Applicant's foreign counsel.

* cited by examiner

APPARATUS FOR DRIVER ASSISTANCE

CROSS-REFERENCE TO RELATED APPLICATION

This application claims the benefit of Korean Patent Application No. 10-2022-0102003, filed on Aug. 16, 2022 in the Korean Intellectual Property Office, the disclosure of which is incorporated herein by reference.

BACKGROUND

1. Field

Embodiments of the present disclosure relate to an apparatus for driver assistance including a plurality of radar modules.

2. Description of the Related Art

Vehicles are the most common transportation in modern society, and the number of people using the vehicles is increasing. Although there are advantages such as easy long-distance traveling and convenience of living with the development of a vehicle technology, a problem that road traffic conditions deteriorate and serious traffic congestion becomes often occurs in densely populated places such as Korea.

Recently, research on vehicles equipped with an advanced driver assist system (ADAS) for actively providing information on a vehicle condition, a driver condition, and a surrounding environment in order to reduce a driver's burden and enhance convenience is actively progressing.

As examples of ADASs installed in vehicles, there are a forward collision avoidance (FCA) system, an autonomous emergency brake (AEB), a driver attention warning system (DAW), etc. Such a system is a system for determining risk of a collision with an object in a traveling situation of a vehicle and providing a warning and avoiding a collision through emergency braking in a collision situation.

SUMMARY

Therefore, it is an aspect of the present disclosure to provide an apparatus for driver assistance including a plurality of radar modules.

Additional aspects of the disclosure will be set forth in part in the description which follows and, in part, will be obvious from the description, or may be learned by practice of the disclosure.

In accordance with one aspect of the present disclosure, an apparatus for driver assistance includes a radar module configured to provide information on an object around a vehicle, and a controller configured to control at least one of a driving device, a braking device, or a steering device of the vehicle based on the information on the object. The radar module includes an antenna module installed on the vehicle to have a sensing area in an outward direction of the vehicle and acquire radar data, and a processor configured to acquire the information on the object around the vehicle based on processing the radar data. The antenna module includes a first board facing a first direction, a first antenna array provided on the first board to radiate radio waves in the first direction and provide the radar data to the processor, a second board facing a second direction different from the first direction, a second antenna array provided on the second board to radiate radio waves in the second direction and provide the radar data to the processor, and a bridge configured to electrically and physically connect the first board and the second board.

Each of the first board and the second board may include a rigid printed circuit board. The bridge may include a flexible printed circuit board.

The bridge may extend from a first surface of the first board to a second surface of the second board.

The antenna module may further include an additional bridge extending from a third surface of the first board to a fourth surface of the second board.

Each of the first board and the second board may include a plurality of layers. The antenna module may further include an additional bridge extending from a middle layer of the first board to a middle layer of the second board.

The first board may include a rigid printed circuit board. Each of the second board and the bridge may include a flexible printed circuit board.

The antenna module may further include a wave guide extending from the first board to the second board.

The processor may include a first processor provided on the first board to process the radar data of the first antenna array, and a second processor provided on the second board to process the radar data of the second antenna array.

The second antenna array and the second processor may be integrally formed as an antenna in package.

In accordance with another aspect of the present disclosure, an apparatus for driver assistance includes an antenna module installed at a rear right side of a vehicle to have a sensing area in rearward and rightward directions of the vehicle and acquire radar data, and a processor configured to acquire information on an object around the vehicle based on processing the radar data. The antenna module includes a first board facing a rear-right direction of the vehicle, a first antenna array provided on the first board to radiate radio waves in the rear-right direction of the vehicle and provide the radar data to the processor, a second board facing the rightward direction of the vehicle, a second antenna array provided on the second board to radiate radio waves in the rightward direction of the vehicle and provide the radar data to the processor, and a bridge configured to electrically and physically connect the first board and the second board.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 3 is a view illustrating one example of a configuration of a first antenna module included in the apparatus for driver assistance according to one embodiment;

3

Figure 7:
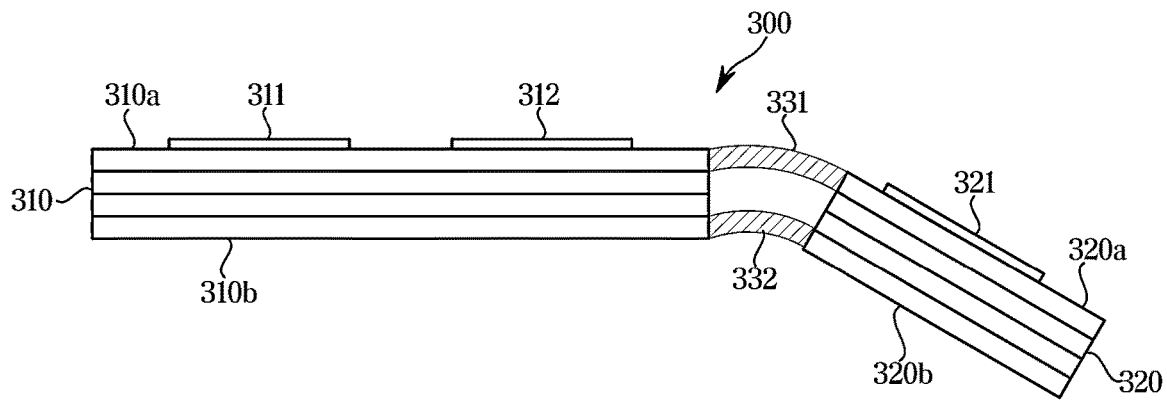
Figure 8:
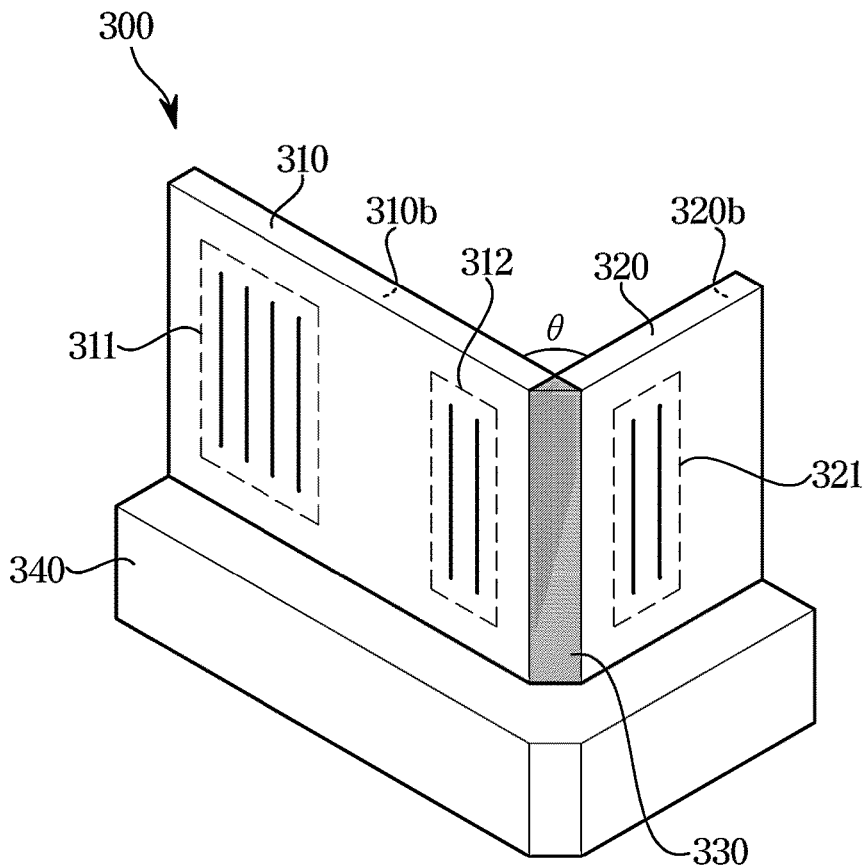
Figure 9:
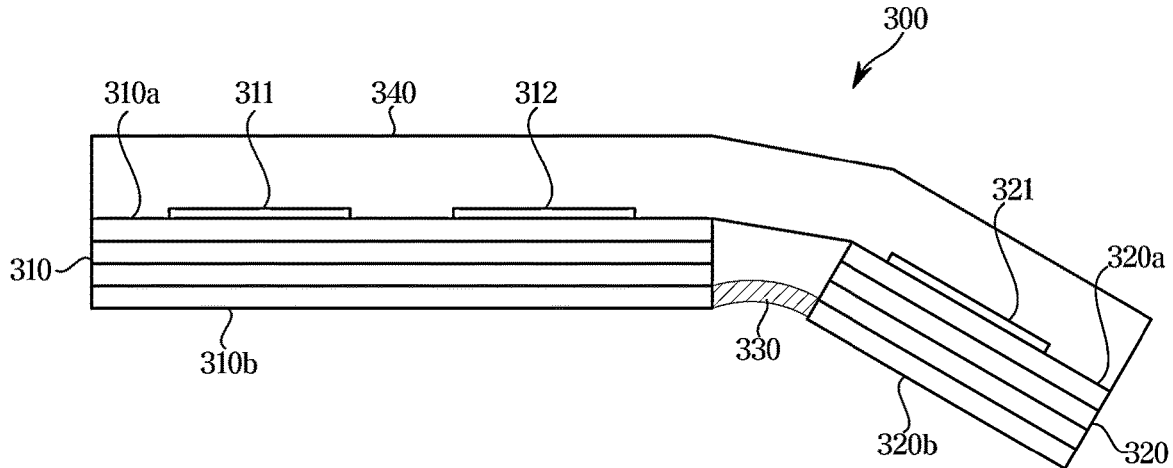
Figure 10:
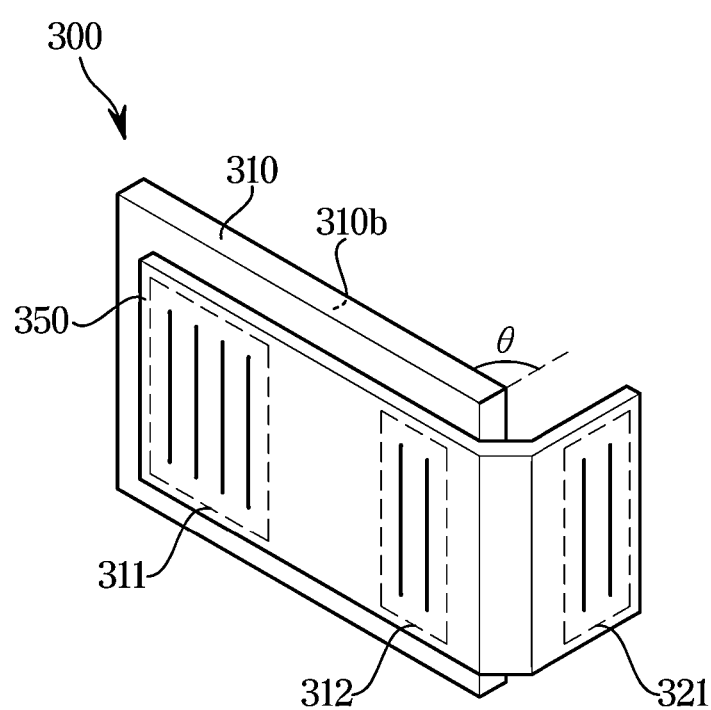
Figure 11:
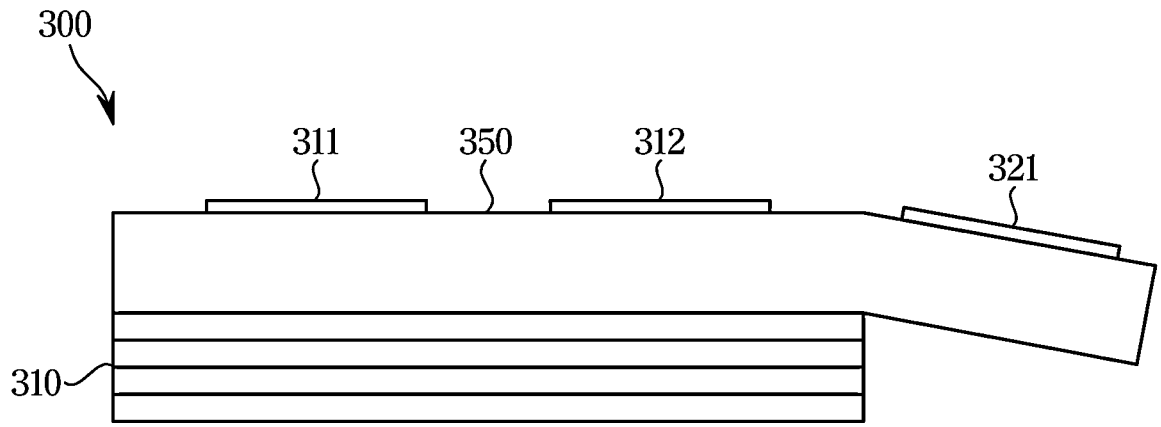

FIG. 7 is a view illustrating one example of a side surface of a first antenna module included in the apparatus for driver assistance according to one embodiment;

FIG. 8 is a view illustrating one example of a configuration of a first antenna module included in the apparatus for driver assistance according to one embodiment;

FIG. 9 is a view illustrating one example of a side surface of a first antenna module included in the apparatus for driver assistance according to one embodiment;

FIG. 10 is a view illustrating one example of a configuration of a first antenna module included in the apparatus for driver assistance according to one embodiment;

FIG. 11 is a view illustrating one example of a side surface of a first antenna module included in the apparatus for driver assistance according to one embodiment;

Figure 12:
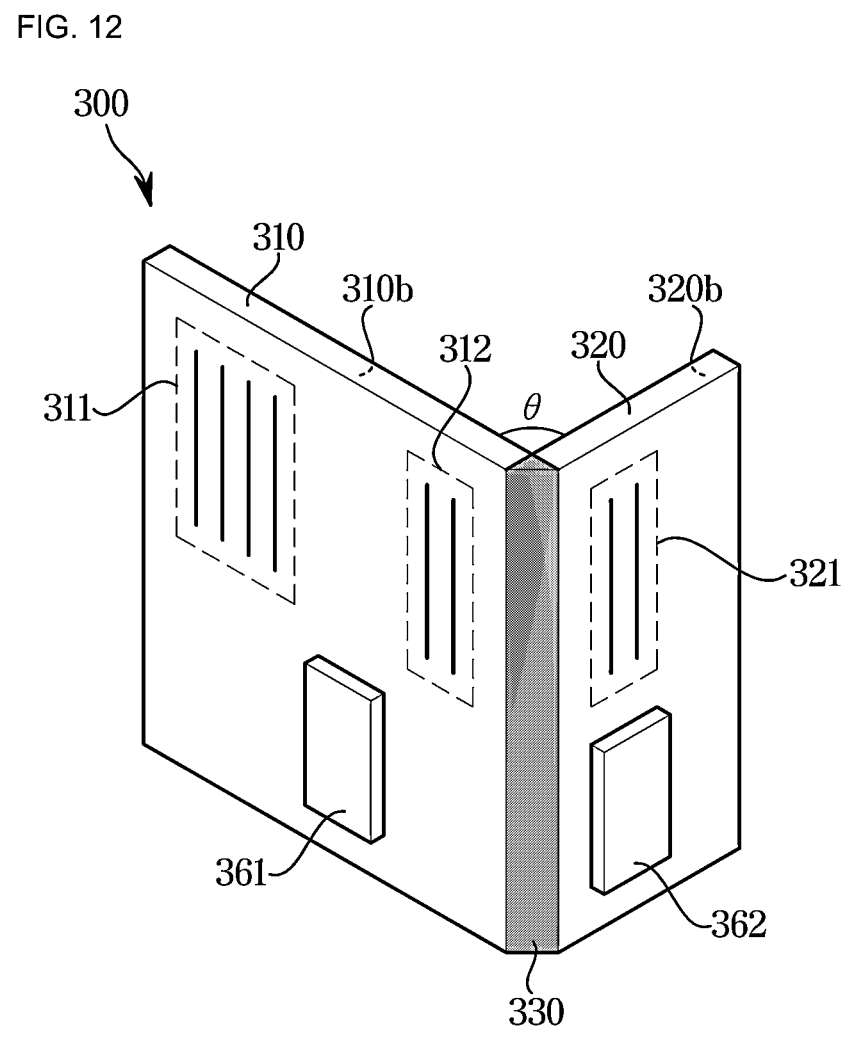

FIG. 12 is a view illustrating one example of a configuration of a first antenna module included in the apparatus for driver assistance according to one embodiment; and FIG. 13 is a view illustrating one example of a configuration of a first antenna module included in the apparatus for driver assistance according to one embodiment.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

The expression, "at least one of a, b, and c," should be understood as including only a, only b, only c, both a and b, both a and c, both b and c, or all of a, b, and c.

Reference will now be made in detail to the exemplary embodiments of the present disclosure, examples of which are illustrated in the accompanying drawings, wherein like reference numerals refer to like elements throughout.

Figure 1:
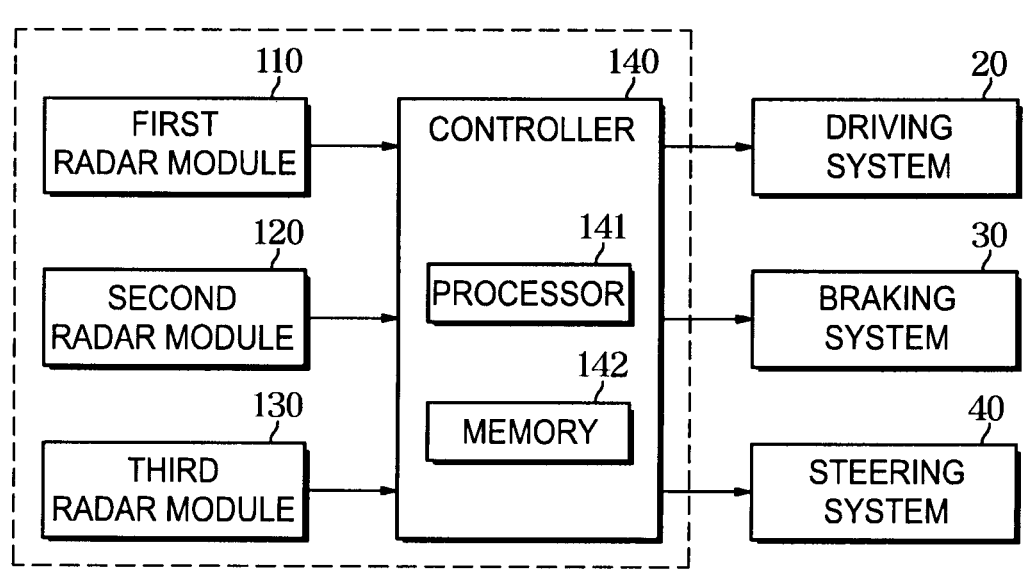
FIG. 1 is a view illustrating configurations of a vehicle and an apparatus for driver assistance according to one embodiment.
Figure 2:
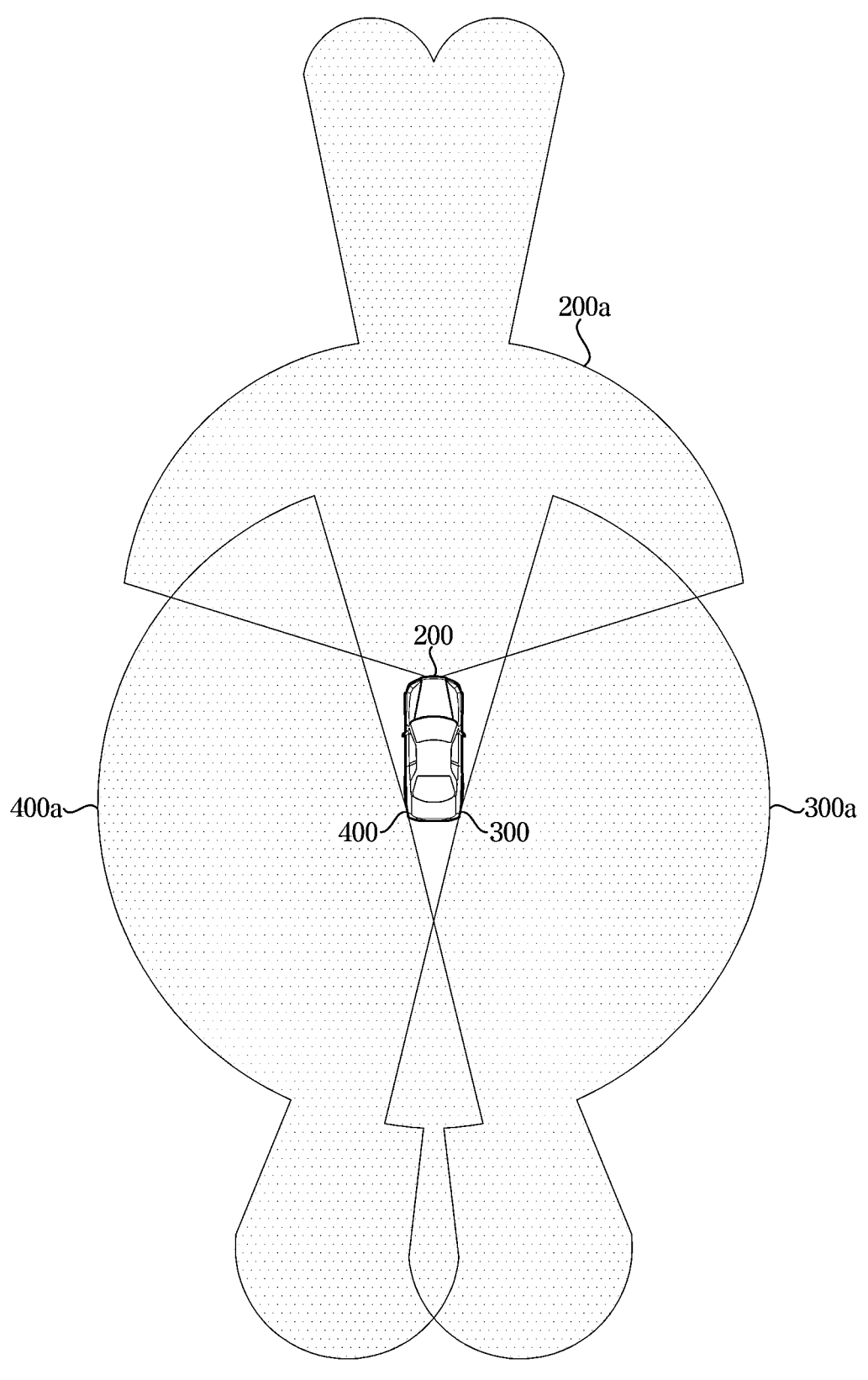
FIG. 2 is a view illustrating the arrangement and sensing areas of radar modules included in the apparatus for driver assistance according to one embodiment.

FIG. 1 is a view illustrating configurations of a vehicle and an apparatus for driver assistance according to one embodiment. FIG. 2 is a view illustrating the arrangement of radar modules included in the apparatus for driver assistance according to one embodiment.

As illustrated in FIGS. 1 and 2, a vehicle 1 includes a driving device 20, a braking device 30, a steering device 40, and an apparatus for driver assistance 100. The driving device 20, the braking device 30, the steering device 40, and the apparatus for driver assistance 100 do not correspond to essential components of the vehicle 1, and at least some of the driving device 20, the braking device 30, the steering device 40, and the apparatus for driver assistance 100 may be omitted.

The driving device 20, the braking device 30, the steering device 40, and the apparatus for driver assistance 100 may communicate with each other via a vehicle communication network NT. For example, the electric devices 20, 30, 40, and 100 included in the vehicle 1 may transmit or receive data via Ethernet, media oriented systems transport (MOST), Flexray, controller area network (CAN), local interconnect network (LIN), or the like.

The driving device 20 may move the vehicle 1 and include, for example, an engine, an engine management system (EMS), a transmission, and a transmission control unit (TCU).

The braking device 30 may stop the vehicle 1 and include, for example, a brake caliper and a brake control module (EBCM). The EBCM may control the brake caliper in response to a driver's braking intention through a brake pedal and/or a request of the apparatus for driver assistance 100.

The steering device 40 may change a traveling direction of the vehicle 1 and include an electronic power steering control module (EPS). The EPS may assist an operation of the steering device 40 so that the driver may easily manipulate a steering wheel in response to the driver's steering intention through the steering wheel. In addition, the EPS may control the steering device in response to a request of the apparatus for driver assistance 100.

The apparatus for driver assistance 100 may provide various functions to the driver. For example, the apparatus for driver assistance 100 may provide lane departure warning (LDW), lane keeping assist (LKA), high beam assist (HBA), autonomous emergency braking (AEB), traffic sign recognition (TSR), adaptive cruise control (ACC), blind spot detection (BSD), and the like.

The apparatus for driver assistance 100 may include a front radar module 110, a first radar module 120, a second radar module 130, and a controller 140. The apparatus for driver assistance 100 is not limited to that illustrated in FIG. 1 and may further include a camera for capturing surroundings of the vehicle 1 or a light detection and ranging (LiDAR) for scanning the surroundings of the vehicle 1 and detecting objects. In addition, the front radar module 110, the first radar module 120, the second radar module 130, and the controller 140 do not correspond to essential components of the apparatus for driver assistance 100, and at least some of the front radar module 110, the first radar module 120, the second radar module 130, and the controller 140 may be omitted.

As illustrated in FIG. 2, the front radar module 110 may be installed at a front side of the vehicle 1 and include a front antenna module 200 having a sensing area 200a in forward, front-right, and front-left directions of the vehicle 1. The front antenna module 200 may be installed, for example, on a grille or a bumper of the vehicle 1.

The front antenna module 200 may include a transmission antenna (or a transmission antenna array) for radiating transmitted radio waves in forward, front-right, and front-left directions of the vehicle 1 and a reception antenna (or a reception antenna array) for receiving reflected radio waves reflected from an object. The front antenna module 200 may acquire detected data from the transmitted radio waves transmitted by the transmission antenna and the reflected radio waves received by the reception antenna. The detected data may include distance information and speed information on other vehicles, pedestrians, or cyclists positioned in front of the vehicle 1.

The front radar module 110 may further include a digital signal processor (DSP) for selectively processing detected data. The DSP may identify an object based on the reflected radio wave, calculate a relative distance to the object based on a phase difference (or a time difference) between the transmitted radio wave and the reflected radio wave, and calculate a relative speed of the object based on a frequency difference between the transmitted radio wave and the reflected radio wave.

The front radar module 110 may be connected to the controller 140 via, for example, a vehicle communication network NT, a hard wire, or a printed circuit board. The first radar module 120 may transmit the detected data to the controller 140.

As illustrated in FIG. 2, the first radar module 120 may be installed at a rear right side of the vehicle 1 and include a first antenna module 300 having a sensing area 300a in rearward, rear-right, and rightward directions of the vehicle 1. In addition, as illustrated in FIG. 2, the second radar module 130 may be installed at a rear left side of the vehicle 1 and include a second antenna module 400 having a sensing area 400a in rearward, rear-left, and leftward directions of the vehicle 1.

Each of the first antenna module 300 and the second antenna module 400 may include the transmission antenna (or the transmission antenna array) and the reception antenna (or the reception antenna array). Each of the first antenna module 300 and the second antenna module 400 may acquire detected data from the transmitted radio wave transmitted by the transmission antenna and the reflected radio wave received by the reception antenna.

Each of the first radar module 120 and the second radar module 130 may include the DSP for selectively processing the detected data. The DSP may identify an object, calculate a relative distance to the object, and calculate a relative speed of the object.

Each of the first radar module 120 and the second radar module 130 may be connected to the controller 140 via, for example, a vehicle communication network NT, a hard wire, or a printed circuit board and transmit the detected data to the controller 140.

The controller 140 may be electrically connected to the front radar module 110, the first radar module 120, and the second radar module 130. In addition, the controller 140 may be connected to the driving device 20, the braking device 30, and the steering device 40 via the vehicle communication network NT.

The controller 140 includes a processor 141 and a memory 142.

The processor 141 may process the detected data of the radar modules 110, 120, and 130 and generate a driving signal, a braking signal, and a steering signal for controlling the driving device 20, the braking device 30, and the steering device 40. For example, the processor 141 may include a digital signal processor for processing the detected data of the radar modules 110, 120, and 130 and/or a micro control unit (MCU) for generating the driving signal, the braking signal, and the steering signal.

The memory 142 may store programs and/or data for the processor 141 to process the detected data and programs and/or data for the processor 141 to generate the driving signal, the braking signal, and/or the steering signal.

The memory 142 may temporarily store the detected data received from the radar modules 110, 120, and 130 and temporarily store a result of processing the detected data of the processor 141.

The memory 142 may include not only volatile memories, such as a static random access memory (SRAM) and a dynamic RAM (DRAM) but also non-volatile memories, such as a flash memory, a read only memory (ROM) and an erasable programmable ROM (EPROM).

Figure 3:
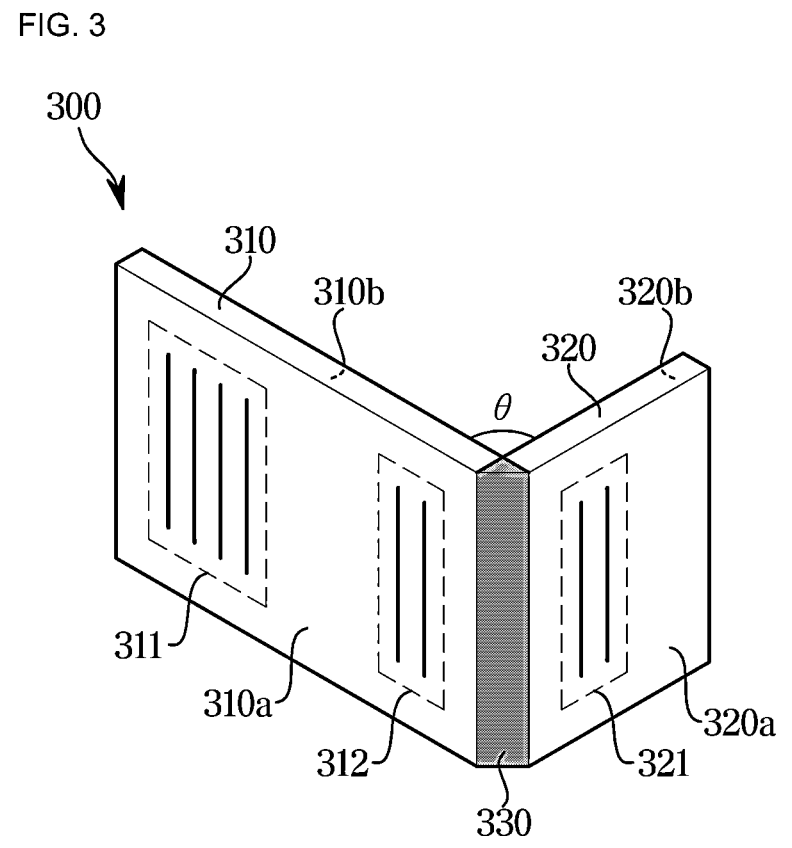
Figure 4:
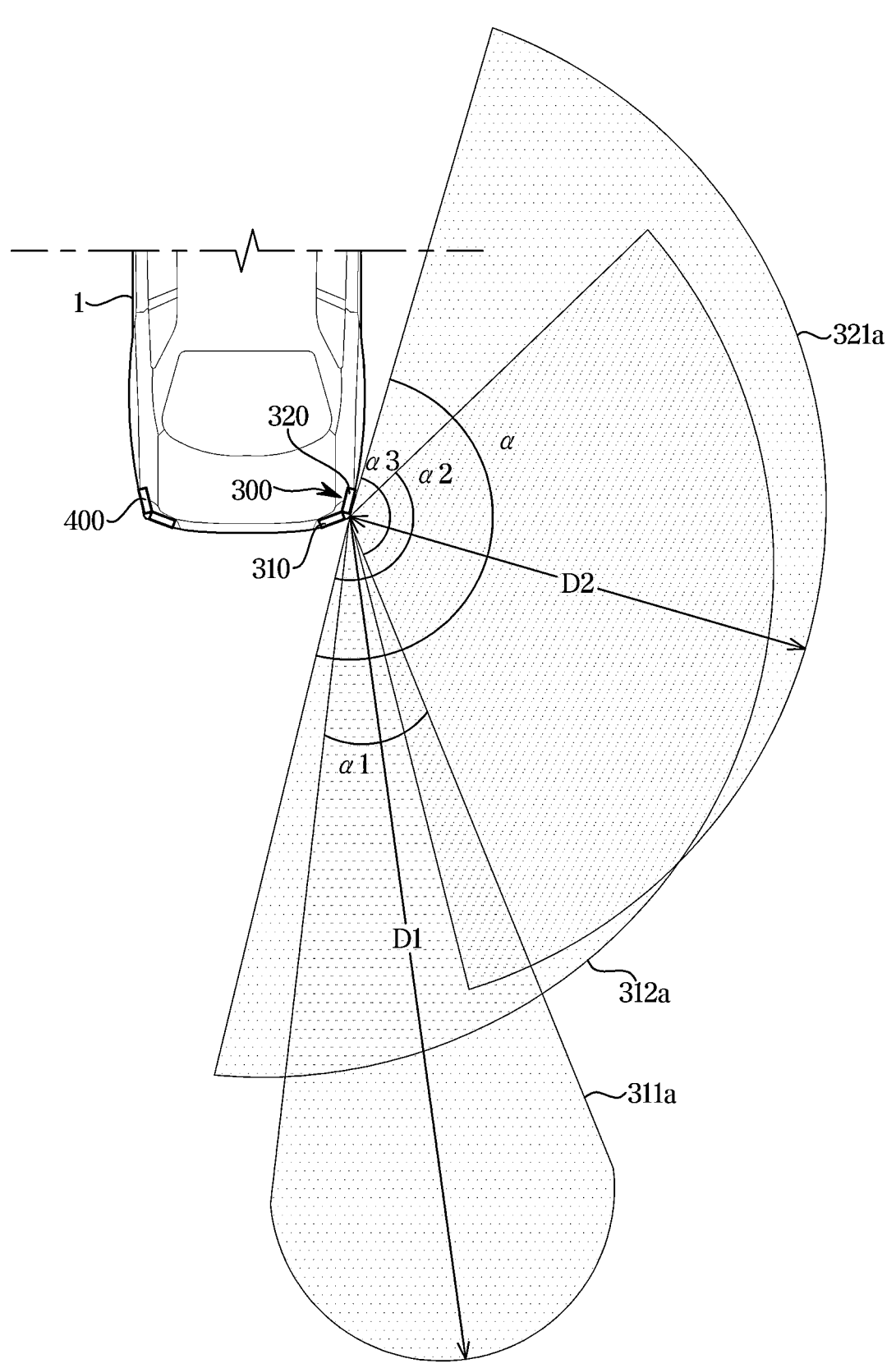
FIG. 4 is a view illustrating one example of a beam pattern of the first antenna module included in the apparatus for driver assistance according to one embodiment.

FIG. 3 is a view illustrating one example of a configuration of the first antenna module included in the apparatus for driver assistance according to one embodiment. FIG. 4 is a view illustrating one example of a beam pattern of the first antenna module included in the apparatus for driver assistance according to one embodiment.

The first antenna module 300 may include a first board 310, a second board 320, a bridge 330, a first antenna array 311, a second antenna array 312, and a third antenna array 321. The first board 310, the second board 320, the bridge 330, the first antenna array 311, the second antenna array 312, and the third antenna array 321 do not correspond to essential components of the first antenna module 300, and at least some thereof may be omitted.

The first board 310, the second board 320, the bridge 330, the first antenna array 311, the second antenna array 312, and the third antenna array 321 may be integrally formed as an antenna module and may be provided in one housing.

For example, as illustrated in FIGS. 3 and 4, the first antenna module 300 may include the first board 310 and the second board 320 provided on different planar surfaces intersecting each other. The first board 310 and the second board 320 may be provided on different planar surfaces and connected by the bridge 330.

An angle θ between the first board 310 and the second board 320 may be greater than 90 degrees and smaller than 180 degrees. For example, an angle θ2 between the first board 310 and the second board 320 may be 120 degrees, 135 degrees, or the like without being limited.

Each of the first board 310 and the second board 320 may include inner surfaces 310b and 320b and outer surfaces 310a and 320a. For example, the first inner surface 310b of the first board 310 may face the second board 320, and the second inner surface 320b of the second board 320 may face the first board 310. In addition, the first outer surface 310a of the first board 310 may face a direction away from the second board 320, and the second outer surface 320a of the second board 320 may face a direction away from the first board 310.

As illustrated in FIG. 4, the first antenna module 300 may be installed on the vehicle 1 so that the first outer surface 310a of the first board 310 is installed to face the rear-right direction of the vehicle 1 and the second outer surface 320a of the second board 320 is installed to face the rightward direction of the vehicle 1.

As described above, the outer surfaces 310a and 320a of the first board 310 and the second board 320 respectively face the rear-right and rightward directions of the vehicle 1, and the first antenna module 300 may radiate radio waves in the rear-right and rightward directions of the vehicle 1 and also receive radio waves reflected from the rear-right and rightward directions of the vehicle 1.

At least one antenna capable of transmitting, receiving, or transmitting and receiving radio waves may be provided on each of the first outer surface 310a of the first board 310 and the second outer surface 320a of the second board 320.

The first board 310 may include the first antenna array 311 and the second antenna array 312. The first antenna array 311 and the second antenna array 312 may be provided on an outer surface of the first board 310.

Each of the first antenna array 311 and the second antenna array 312 may include a plurality of antennas. Each of the plurality of antennas may be various types of antennas. For example, as illustrated in FIG. 3, each of the plurality of antennas may be a micro-strip antenna. However, the type of each of the plurality of antennas is not limited to that illustrated in FIG. 3. For example, each of the plurality of antennas may be a slot antenna or a patch antenna.

The number of antennas constituting the first antenna array 311 may be different from the number of antennas constituting the second antenna array 312. For example, the number of antennas constituting the first antenna array 311 may be greater than the number of antennas constituting the second antenna array 312.

The first antenna array 311 may radiate radio waves having a first beam pattern 311a. Here, the beam pattern may represent an intensity of the radio wave radiated from the antenna in a three-dimensional space or on a two-dimensional planar surface. For example, the beam pattern may be a curve connecting half power points (3 dB points) at which the intensity of the radio wave is half.

As illustrated in FIG. 4, the first beam pattern 311a may have a substantially fan shape extending to the rear of the vehicle 1.

The second antenna array 312 may radiate radio waves having a second beam pattern 312a. The second beam pattern 312a may have a substantially fan shape extending to the rear right side of the vehicle 1.

An arrival distance D1 of the first beam pattern 311a is greater than an arrival distance D2 of the second beam pattern 312a. That is, the radio waves radiated from the first antenna array 311 may propagate farther than the radio waves radiated from the second antenna array 312. In addition, a reception distance of the first antenna array 311 may be longer than a reception distance of the second antenna array 312.

A center angle α2 of the second beam pattern 312a is greater than a center angle α1 of the first beam pattern 311a. That is, the radio waves radiated from the second antenna array 312 may propagate at a wider angle than the radio waves radiated from the second antenna array 311. In addition, a reception angle range of the second antenna array 312 is greater than a reception angle range of the first antenna array 311.

As described above, the first beam pattern 311a of the first antenna array 311 may be narrower and longer than the second beam pattern 312a of the second antenna array 312. That is, the first antenna array 311 may be a far field antenna, and the second antenna array 312 may be a near field antenna.

The second board 320 may include the third antenna array 321. The third antenna array 321 may be provided on the outer surface 320a of the second board 320.

The third antenna array 321 may include a plurality of antennas. For example, the number of antennas constituting the third antenna array 321 may be equal to the number of antennas constituting the second antenna array 312.

The third antenna array 321 may radiate radio waves having a fan-shaped third beam pattern 321a. The third beam pattern 321a of the third antenna array 321 may have a substantially fan shape extending to the right side of the vehicle 1.

As described above, the first beam pattern 311a of the first antenna array 311 may form a far field beam pattern of the first antenna module 300.

In addition, the second beam pattern 312a of the second antenna array 312 and the third beam pattern 321a of the third antenna array 321 may be integrally formed as a near field beam pattern of the first antenna module 300. Here, at least a part of the second beam pattern 312a of the second antenna array 312 may overlap the third beam pattern 321a of the third antenna array 321.

Although a field of view angle (center angle of the beam pattern) of the near field antenna may be theoretically 180 degrees, it is generally known that the field of view angle of the near field antenna does not exceed a maximum of 170 degrees.

Since the second beam pattern 312a of the second antenna array 312 and the third beam pattern 321a of the third antenna array 321 are integrally formed as the near field beam pattern of the first antenna module 300 and at least a part of the second beam pattern 312a of the second antenna array 312 overlaps the third beam pattern 321a of the third antenna array 321, a near field of view angle α of the first antenna module 300 may be greater than each of the center angle α2 of the second beam pattern 312a and a center angle α3 of the third beam pattern 321a.

As described above, the near field of view angle α of the first antenna module 300 may be greater than the center angles α2 and α3 of the beam patterns 312a and 321a of the individual near field antennas 312 and 321. That is, the sensing area of the first antenna module 300 is wider than the sensing areas of the individual near field antennas 312 and 321.

Therefore, the first antenna module 300 installed at the rear right side of the vehicle 1 may detect both an object positioned at the rear right side of the vehicle 1 and objects positioned behind the vehicle 1 and at the right side of the vehicle 1.

In addition, the first antenna module 300 may cover for a rear antenna provided at the rear side of the vehicle 1.

The second antenna module 400 has the same structure and function as the first antenna module 300, and a description of the second antenna module 400 is replaced with the description of the first antenna module 300. The second antenna module 400 installed at the rear left side of the vehicle 1 may detect both an object positioned at the rear left side of the vehicle 1 and objects positioned behind the vehicle 1 and at the left side of the vehicle 1. Therefore, the second antenna module 400 may cover for a rear antenna provided at the rear side of the vehicle 1.

The front antenna module 200 has the same structure and function as the first antenna module 300, and a description of the front antenna module 200 is replaced with the description of the first antenna module 300. The front antenna module 200 installed at the front side of the vehicle 1 may detect both an object positioned in front of the vehicle 1 and objects positioned at the front left and front right sides of the vehicle 1. Therefore, the front antenna module 200 may cover for corner antennas provided at the front left and front right sides of the vehicle 1.

Hereinafter, a structure of the first antenna module 300 will be described. The second antenna module 400 and the front antenna module 200 may be the same as or at least similar to the first antenna module 300 to be described below. A description of the second antenna module 400 and the front antenna module 200 may be replaced with the following description of the first antenna module 300.

Figure 5:
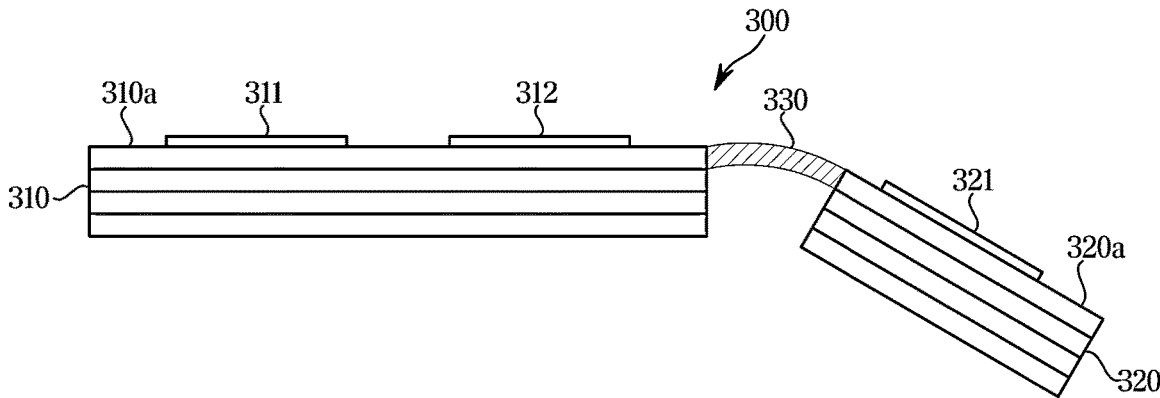
FIG. 5 is a view illustrating one example of a side surface of a first antenna module included in the apparatus for driver assistance according to one embodiment.

FIG. 5 is a view illustrating one example of a side surface of a first antenna module included in the apparatus for driver assistance according to one embodiment.

As illustrated in FIG. 5, the first antenna module 300 may include the first board 310, the second board 320, the bridge 330, the first antenna array 311, the second antenna array 312, and the third antenna array 321. The first board 310, the second board 320, the bridge 330, the first antenna array 311, the second antenna array 312, and the third antenna array 321 do not correspond to essential components of the first antenna module 300, and at least some thereof may be omitted.

The first board 310, the second board 320, the bridge 330, the first antenna array 311, the second antenna array 312, and the third antenna array 321 may be integrally formed as an antenna module and may be provided in one housing.

The first antenna array 311 and the second antenna array 312 may be provided on the first outer surface 310a of the first board 310. The first antenna array 311 and the second antenna array 312 may be the same as the first antenna array and the second antenna array described with reference to FIG. 3.

The third antenna array 321 may be provided on the second outer surface 320a of the second board 320. The third antenna array 321 may be the same as the third antenna array described with reference to FIG. 3.

The first antenna module 300 may be formed of a rigid-flexible printed circuit board (RF-PCB). For example, the first antenna module 300 may include a rigid printed circuit board (RPCB) and a flexible printed circuit board (FPCB).

The first board 310 may include the RPCB including one or more layers. The first board 310 may provide electrical signals to the first antenna array 311 and/or the second antenna array 312 or receive electrical signals from the first antenna array 311 and/or the second antenna array 312.

The first board 310, which is the RPCB, may have no elasticity or very low elasticity. That is, the first board 310 may not be bent by an external force. Therefore, the first board 310 may firmly support the first antenna array 311 and the second antenna array 312 mounted on the first board 310.

The second board 320 may include the RPCB including one or more layers. The second board 320 may provide electrical signals to the third antenna array 321 or receive electrical signals from the third antenna array 321.

The second board 320, which is the RPCB, may have no elasticity or very low elasticity. Therefore, the second board 320 may firmly support the third antenna array 321 mounted on the second board 320.

The bridge 330 may electrically and physically connect the first board 310 and the second board 320. For example, the bridge 330 may extend from the first outer surface 310a of the first board 310 to the second outer surface 320a of the second board 320.

The bridge 330 may include, for example, the FPCB.

The bridge 330 may electrically connect the first board 310 and the second board 320 so that electrical signals (e.g., radio frequency (RF) signals or low-frequency signals) may be transmitted on the first board 310 and the second board 320. Therefore, control signals for controlling the third antenna array 321 installed on the second board 320 may be transmitted from the first board 310 to the second board 320. In addition, the detected data of the third antenna array 321 installed on the second board 320 may be transmitted from the second board 320 to the first board 310 through the bridge 330.

The bridge 330 may connect the first board 310 and the second board so that the second board 320 is not separated from the first board 310 or the first board 310 is not separated from the second board 320.

In addition, the bridge 330 including the FPCB may be bent so that an angle between the first board 310 and the second board 320 is smaller than 180 degrees.

Therefore, a direction in which the second antenna array 312 of the first board 310 radiates radio waves may be different from a direction in which the third antenna array 321 of the second board 320 radiates radio waves. For example, the second antenna array 312 of the first board 310 may radiate the radio waves to the rear right side of the vehicle 1, and the third antenna array 321 of the second board 320 may radiate the radio waves to the right side of the vehicle 1.

Therefore, a field of view angle of the first antenna module 300 may be greater than a field of view angle of the second antenna array 312 or the third antenna array 321.

Figure 6:
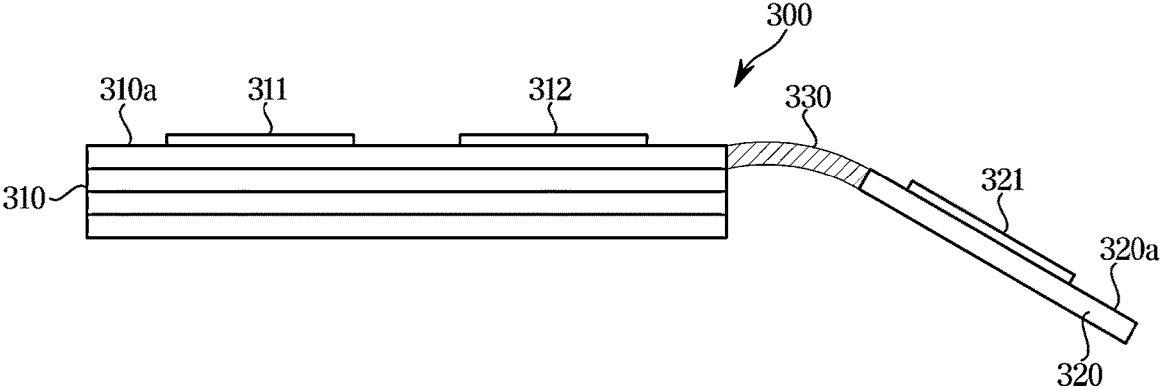
FIG. 6 is a view illustrating one example of a side surface of a first antenna module included in the apparatus for driver assistance according to one embodiment.

FIG. 6 is a view illustrating one example of a side surface of a first antenna module included in the apparatus for driver assistance according to one embodiment.

As illustrated in FIG. 6, the first antenna module 300 may include the first board 310, the second board 320, the bridge 330, the first antenna array 311, the second antenna array 312, and the third antenna array 321. The first board 310, the second board 320, the bridge 330, the first antenna array 311, the second antenna array 312, and the third antenna array 321 do not correspond to essential components of the first antenna module 300, and at least some thereof may be omitted.

The first board 310, the second board 320, the bridge 330, the first antenna array 311, the second antenna array 312, and the third antenna array 321 may be integrally formed as an antenna module and may be provided in one housing.

The first antenna array 311, the second antenna array 312, and the third antenna array 321 may be the same as the first antenna array, the second antenna array, and the third antenna array described with reference to FIG. 3.

The first antenna module 300 may be formed of the RF-PCB.

The first board 310 may include the RPCB including one or more layers. The first board 310 may be the same as the first board described with reference to FIG. 5.

The second board 320 may include the FPCB including one or more layers.

The second board 320 including the FPCB may have elasticity and may be bent. The second board 320 may be provided with the third antenna array 321.

The bridge 330 may electrically and physically connect the first board 310 and the second board 320 and include the FPCB. For example, the bridge 330 may be connected to the first outer surface 310*a* of the first board 310 and integrally provided with the second board 320 including the FPCB.

The bridge 330 may electrically connect the first board 310 and the second board 320 to transmit electrical signals between the first board 310 and the second board 320 and physically connect the first board 310 and the second board 320 so that the second board 320 and the first board 310 are not separated from each other.

In addition, the bridge 330 may be bent so that an inner angle between the first board 310 and the second board 320 is smaller than 180 degrees.

As necessary, the bridge 330 may be omitted, and a part of the second board 320 including the FPCB may serve as the bridge 330. That is, a part of the second board 320 may be bent, and thus a direction in which the second antenna array 312 radiates radio waves may be different from a direction in which the third antenna array 321 radiates radio waves.

FIG. 7 is a view illustrating one example of a side surface of a first antenna module included in the apparatus for driver assistance according to one embodiment.

As illustrated in FIG. 7, the first antenna module 300 may include the first board 310, the second board 320, a first bridge 331, a second bridge 332, the first antenna array 311, the second antenna array 312, and the third antenna array 321. The first board 310, the second board 320, the first bridge 331, the second bridge 332, the first antenna array 311, the second antenna array 312, and the third antenna array 321 do not correspond to essential components of the first antenna module 300, and at least some thereof may be omitted.

The first board 310, the second board 320, the first bridge 331, the second bridge 332, the first antenna array 311, the second antenna array 312, and the third antenna array 321 may be integrally formed as an antenna module and may be provided in one housing.

The first board 310, the second board 320, the first bridge 331, the first antenna array 311, the second antenna array 312, and the third antenna array 321 may be the same as the first board, the second board, the bridge, the first antenna array, and the second antenna array illustrated in FIG. 5, respectively.

The second bridge 332 may electrically and physically connect the first board 310 and the second board 320. For example, the second bridge 332 may extend from the first inner surface 310*b* of the first board 310 to the second inner surface 320*b* of the second board 320. As another example, the second bridge 332 may extend from a middle layer of the first board 310 to a middle layer of the second board 320.

The second bridge 332 may electrically connect the first board 310 and the second board 320 to transmit electrical signals between the first board 310 and the second board 320 and physically connect the first board 310 and the second board 320 so that the second board 320 and the first board 310 are not separated from each other.

The second bridge 332 may allow the inner angle between the first board 310 and the second board 320 to be maintained smaller than 180 degrees. For example, the second bridge 332 may be shorter than the first bridge 331. Therefore, the inner angle between the first board 310 and the second board 320 may be maintained at an angle smaller than 180 degrees. That is, the second board 320 may be tilted to the second bridge 332 with respect to the first board 310.

The second bridge 332 may supplement the rigidity of the first antenna module 300. The FPCB has low rigidity while having flexibility. The second bridge 332 may supplement the low rigidity of the first bridge 331.

FIG. 8 is a view illustrating one example of a configuration of a first antenna module included in the apparatus for driver assistance according to one embodiment. FIG. 9 is a view illustrating one example of a side surface of a first antenna module included in the apparatus for driver assistance according to one embodiment.

As illustrated in FIGS. 8 and 9, the first antenna module 300 may include the first board 310, the second board 320, the bridge 330, a wave guide 340, the first antenna array 311, the second antenna array 312, and the third antenna array 321. The first board 310, the second board 320, the bridge 330, the wave guide 340, the first antenna array 311, the second antenna array 312, and the third antenna array 321 do not correspond to essential components of the first antenna module 300, and at least some thereof may be omitted.

The first board 310, the second board 320, the bridge 330, the wave guide 340, the first antenna array 311, the second antenna array 312, and the third antenna array 321 may be integrally formed as an antenna module and may be provided in one housing.

The first board 310, the second board 320, the first antenna array 311, the second antenna array 312, and the third antenna array 321 may be the same as the first board, the second board, the first antenna array, the second antenna array, and the third antenna array, respectively, described with reference to FIG. 5.

The bridge 330 may electrically and physically connect the first board 310 and the second board 320. For example, the bridge 330 may extend from the first inner surface 310*b* of the first board 310 to the second inner surface 320*b* of the second board 320. As another example, the bridge 330 may extend from the middle layer of the first board 310 to the middle layer of the second board 320.

The bridge 330 may electrically connect the first board 310 and the second board 320 to transmit electrical signals between the first board 310 and the second board 320 and physically connect the first board 310 and the second board 320 so that the second board 320 and the first board 310 are not separated from each other.

The wave guide 340 may electrically and physically connect the first board 310 and the second board 320. For example, the wave guide 340 may extend from the first outer surface 310*a* of the first board 310 to the second outer surface 320*a* of the second board 320.

The wave guide 340 may have a shape of a polygonal column having outer walls surrounding a hollow.

The outer wall may have electrical conductivity so that electricity flows. The outer wall may be electrically connected to the first board 310 and/or the second board 320 through an electrically conductive ball grid. For example, the outer wall may be connected to a ground of the first antenna module 300 or a ground of the vehicle 1 through the first board and/or the second board.

The hollow inside the wave guide 340 may be a passage through which an electromagnetic field type RF signal passes. The RF signal may be provided to an inside of the wave guide 340 through a feeding unit and propagated along the wave guide 340 within the wave guide 340. For example, the RF signal may be transmitted from the first board 310 to the second board 320 along the wave guide 340 and may also be transmitted from the second board 320 to the first board 310 along the wave guide 340.

The wave guide 340 may supplement the rigidity of the first antenna module 300. The bridge 330 formed of the FPCB has low rigidity while having flexibility. On the other hand, since the wave guide 340 includes an electrically conductive metal material, the wave guide 340 may have a higher rigidity than the FPCB.

FIG. 10 is a view illustrating one example of a configuration of a first antenna module included in the apparatus for driver assistance according to one embodiment. FIG. 11 is a view illustrating one example of a side surface of a first antenna module included in the apparatus for driver assistance according to one embodiment.

As illustrated in FIGS. 10 and 11, the first antenna module 300 may include a board 310 and an antenna structure 350.

The board 310 may include the RPCB including one or more layers like the first board described with reference to FIG. 5.

The board 310 may provide electrical signals to the antenna structure 350 or receive electrical signals from the antenna structure 350.

The antenna structure 350 may include the first antenna array 311, the second antenna array 312, and the third antenna array 321 and may be integrally provided. That is, electrically conductive patterns such as metal may be formed on the antenna structure 350, and the first antenna array 311, the second antenna array 312, and the third antenna array 321 may be implemented by the electrically conductive patterns.

The first antenna array 311 and the second antenna array 312 may be formed on the same planar surface, and the third antenna array 321 and the first and second antenna arrays 311 and 312 may be formed on different planar surfaces.

That is, the antenna structure 350 may have a bent shape. The first antenna array 311 and the second antenna array 312 may be provided on one surface having the bent shape of the antenna structure 350, and the third antenna array 321 may be provided on the other surface thereof.

FIG. 12 is a view illustrating one example of a configuration of a first antenna module included in the apparatus for driver assistance according to one embodiment.

As illustrated in FIG. 12, the first antenna module 300 may include the first board 310, the second board 320, the bridge 330, a first processor 361, the first antenna array 311, the second antenna array 312, a second processor 362, and the third antenna array 321. The first board 310, the second board 320, the bridge 330, the first processor 361, the first antenna array 311, the second antenna array 312, the second processor 362, and the third antenna array 321 do not correspond to essential components of the first antenna module 300, and at least some thereof may be omitted.

The first board 310, the second board 320, the bridge 330, the first processor 361, the first antenna array 311, the second antenna array 312, the second processor 362, and the third antenna array 321 may be integrally formed as an antenna module and may be provided in one housing.

The first board 310, the second board 320, the bridge 330, the first antenna array 311, the second antenna array 312, and the third antenna array 321 may be the same as the first board, the second board, the bridge, the first antenna array, and the second antenna array, respectively, illustrated in FIG. 5.

The first processor 361 may be provided on the first board 310. The first processor 361 may provide electrical signals so that the first antenna array 311 and/or the second antenna array 312 provided on the first board 310 radiate radio waves, receive electrical signals received from the first antenna array 311 and/or the second antenna array 312, and process the received electrical signals.

The first processor 361 may identify an object based on the electrical signals received from the first antenna array 311 and/or the second antenna array 312. The first processor

361 may calculate a relative distance to the object based on a phase difference (or a time difference) between the transmitted radio wave and the reflected radio wave of the first antenna array 311 and/or the second antenna array 312. In addition, the first processor 361 may calculate the relative speed of the object based on a frequency difference between the transmitted radio wave and the reflected radio wave of the first antenna array 311 and/or the second antenna array 312.

The second processor 362 may be provided on the second board 320. The second processor 362 may provide electrical signals so that the third antenna array 321 provided on the second board 320 radiates radio waves, receive electrical signals received from the third antenna array 321, and process the received electrical signals.

The second processor 362 may identify an object based on the electrical signals received from the third antenna array 321. The second processor 362 may calculate a relative distance to the object based on a phase difference (or a time difference) between the transmitted radio wave and the reflected radio wave of the third antenna array 321. In addition, the second processor 362 may calculate a relative speed of the object based on a frequency difference between the transmitted radio wave and the reflected radio wave of the third antenna array 321.

As described above, by providing the first processor 361 and the second processor 362 capable of processing the detected data on the first board 310 and the second board 320, respectively, it is possible to minimize the exchange of the RF signal through the bridge 330. In addition, it is possible to minimize damage to the RF signal while passing through the bridge 330.

Figure 13:
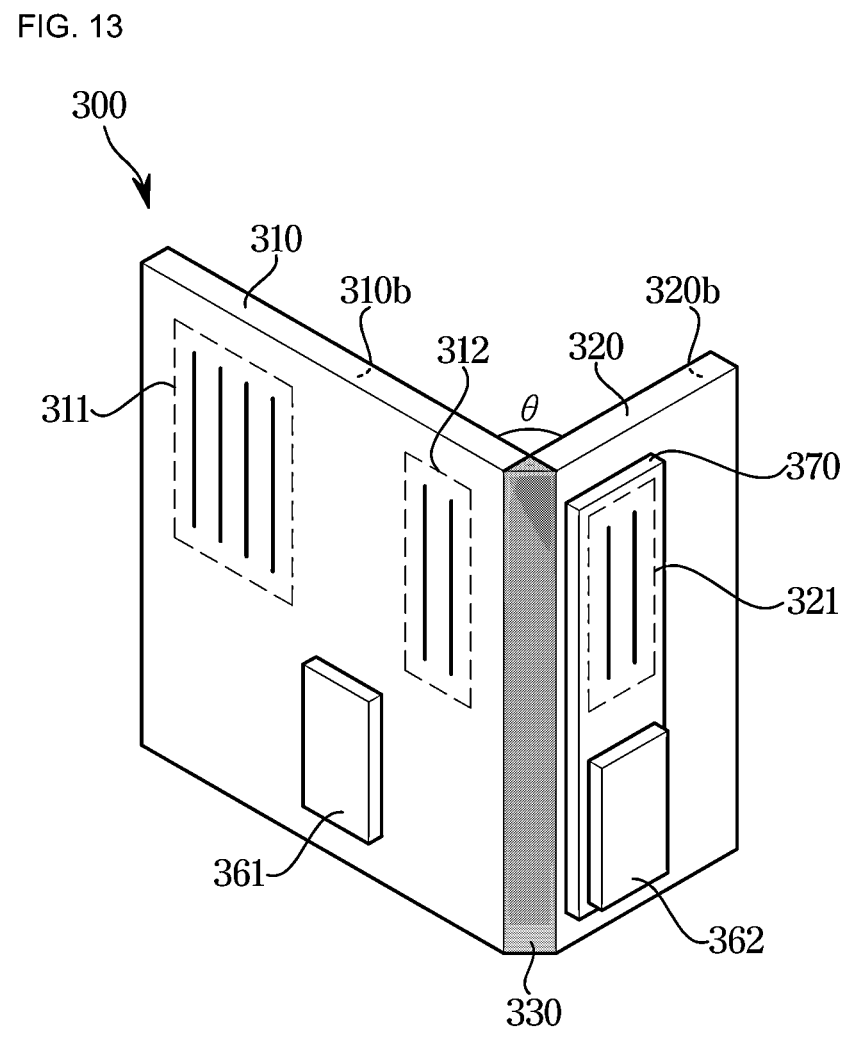

FIG. 13 is a view illustrating one example of a configuration of a first antenna module included in the apparatus for driver assistance according to one embodiment.

As illustrated in FIG. 13, the first antenna module 300 may include the first board 310, the second board 320, the bridge 330, the first processor 361, the first antenna array 311, the second antenna array 312, and an antenna in package (AIP) 370. The first board 310, the second board 320, the bridge 330, the first processor 361, the first antenna array 311, the second antenna array 312, and the AIP 370 do not correspond to essential components of the first antenna module 300, and at least some thereof may be omitted.

The first board 310, the second board 320, the bridge 330, the first processor 361, the first antenna array 311, the second antenna array 312, and the AIP 370 may be integrally formed as an antenna module and may be provided in one housing.

The first board 310, the second board 320, the bridge 330, the first processor 361, the first antenna array 311, and the second antenna array 312 may be the same as the first board, the second board, the bridge, the first processor, the first antenna array, and the second antenna array, respectively, illustrated in FIG. 12.

The AIP 370 may be provided on the second board 320. The AIP 370 may include the third antenna array 321 and the second processor 362. For example, the third antenna array 321 and the second processor 362 may be integrally formed as the AIP 370.

That is, the AIP 370 in which the third antenna array 321 and the second processor 362 are integrated may be provided on the second board 320.

As is apparent from the above description, it is possible to provide an apparatus for driver assistance including a plurality of radar modules. Therefore, it is possible to minimize the number of radar modules.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. An apparatus for driver assistance, the apparatus comprising:
   a radar module configured to provide information on an object around a vehicle; and
   a controller configured to control at least one of a driving device, a braking device, or a steering device of the vehicle based on the information on the object,
   wherein the radar module comprises:
      an antenna module installed on the vehicle to have a sensing area in an outward direction of the vehicle and acquire radar data; and
      a processor configured to acquire the information on the object around the vehicle based on processing the radar data, and

wherein the antenna module comprises:
   a first board facing a first direction;
   a first antenna array provided on the first board to radiate radio waves in the first direction and provide the radar data to the processor;
   a second board facing a second direction different from the first direction;
   a second antenna array provided on the second board to radiate radio waves in the second direction and provide the radar data to the processor;
   a bridge extending from a first surface of the first board to a first surface of the second board and configured to electrically and physically connect the first board with the second board; and
   an additional bridge extending from a second surface of the first board to a second surface of the second board, wherein an angle between the first board and the second board is within a predetermined angle range, and
wherein the angle is formed based on bending of the bridge and the additional bridge.

2. The apparatus of claim 1, wherein each of the first board and the second board comprises a rigid printed circuit board, and
   the bridge comprises a flexible printed circuit board.

3. The apparatus of claim 1, wherein each of the first board and the second board comprises a plurality of layers.

4. The apparatus of claim 1, wherein the first board comprises a rigid printed circuit board, and
   each of the second board and the bridge comprises a flexible printed circuit board.

5. The apparatus of claim 1, wherein the processor comprises:
   a first processor provided on the first board to process the radar data of the first antenna array; and
   a second processor provided on the second board to process the radar data of the second antenna array.

6. The apparatus of claim 5, wherein the second antenna array and the second processor are integrally formed as an antenna in package.

7. An apparatus for driver assistance, the apparatus comprising:
   an antenna module installed at a rear right side of a vehicle to have a sensing area in rearward and rightward directions of the vehicle and acquire radar data; and
   a processor configured to acquire information on an object around the vehicle based on processing the radar data,
   wherein the antenna module comprises:
      a first board facing a rear-right direction of the vehicle;
      a first antenna array provided on the first board to radiate radio waves in the rear-right direction of the vehicle and provide the radar data to the processor;
      a second board facing the rightward direction of the vehicle;
      a second antenna array provided on the second board to radiate radio waves in the rightward direction of the vehicle and provide the radar data to the processor;
      a bridge extending from a first surface of the first board to a first surface of the second board and configured to electrically and physically connect the first board and the second board; and
      an additional bridge extending from a second surface of the first board to a second surface of the second board, wherein an angle between the first board and the second board is within a predetermined angle range, and

wherein the angle is formed based on bending of the bridge and the additional bridge.

8. The apparatus of claim 7, wherein each of the first board and the second board comprises a rigid printed circuit board, and
the bridge comprises a flexible printed circuit board.

9. The apparatus of claim 7, wherein each of the first board and the second board comprises a plurality of layers.

10. The apparatus of claim 7, wherein the first board comprises a rigid printed circuit board, and
each of the second board and the bridge comprises a flexible printed circuit board.

11. The apparatus of claim 7, wherein the processor comprises:
a first processor provided on the first board to process the radar data of the first antenna array; and
a second processor provided on the second board to process the radar data of the second antenna array.

12. The apparatus of claim 11, wherein the second antenna array and the second processor are integrally formed as an antenna in package.

13. An apparatus for driver assistance, the apparatus comprising:
a radar module configured to provide information on an object around a vehicle; and
a controller configured to control at least one of a driving device, a braking device, or a steering device of the vehicle based on the information on the object,

wherein the radar module comprises:
an antenna module installed on the vehicle to have a sensing area in an outward direction of the vehicle and acquire radar data; and
a processor configured to acquire the information on the object around the vehicle based on processing the radar data, and
wherein the antenna module comprises:
a first board facing a first direction;
a first antenna array provided on the first board to radiate radio waves in the first direction and provide the radar data to the processor;
a second board facing a second direction different from the first direction;
a second antenna array provided on the second board to radiate radio waves in the second direction and provide the radar data to the processor;
a bridge extending from an inner surface of the first board to an inner surface of the second board; and
a wave guide having a shape of a polygonal column and extending from an outer surface of the first board to an outer surface of the second board,
wherein the first board and the second board are electrically and physically connected to each other at an angle based on the wave guide having the shape of the polygonal column and bending of the bridge;
wherein the angle is greater than 90 degrees and smaller than 180 degrees.

* * * * *